United States Patent [19]
Yokota et al.

[11] Patent Number: 5,966,404
[45] Date of Patent: Oct. 12, 1999

[54] READER/WRITER FOR PERFORMING EFFICIENT TRANSMISSION/RECEPTION WITH NO-BATTERY INFORMATION STORAGE MEDIUM

[75] Inventors: Tsuneshi Yokota, Kawasaki; Kazuki Iwata, Yokohama; Kiyohito Sudo, Kawasaki, all of Japan

[73] Assignee: Kabushiki Kaisha Toshiba, Kawasaki, Japan

[21] Appl. No.: 08/929,529

[22] Filed: Sep. 15, 1997

[30] Foreign Application Priority Data

Sep. 19, 1996 [JP] Japan .................................. 8-247691

[51] Int. Cl.$^6$ .................................. H04B 1/38; H04L 5/16
[52] U.S. Cl. .................... 375/219; 340/825.54; 235/375; 235/449
[58] Field of Search ..................... 340/825.54; 375/219, 375/256, 257, 258, 268, 282, 259, 377; 235/280, 375, 449

[56] References Cited

U.S. PATENT DOCUMENTS

| | | | |
|---|---|---|---|
| 4,924,171 | 5/1990 | Baba et al. | 323/347 |
| 5,113,184 | 5/1992 | Katayama | 340/825.54 |
| 5,418,353 | 5/1995 | Katayama et al. | 235/380 |
| 5,751,765 | 5/1998 | Matsubara | 375/219 |

*Primary Examiner*—Chi H. Pham
*Assistant Examiner*—Jean B Corrielus
*Attorney, Agent, or Firm*—Pillsbury Madison & Sutro, LLP

[57] ABSTRACT

A reader/writer transmits power and modulated data to a no-battery information storage medium having a communication function in a noncontact state, and receives modulated data from the no-battery information storage medium. The reader/writer has a driver, a loop antenna, and a current detection unit. The driver transmits the power and the modulated data. The loop antenna is connected to the output line of the driver. The current detection unit is arranged between the loop antenna and the output line of the driver. While the reader/writer supplies a transmission carrier current from the driver to the loop antenna, if it receives the modulated data from the no-battery information storage medium, it uses the current detection unit to extract, as a reception signal, a change in transmission carrier current of the loop antenna caused by the modulated data signal received by the loop antenna.

21 Claims, 6 Drawing Sheets

READER/WRITER FOR PERFORMING EFFICIENT TRANSMISSION/RECEPTION WITH NO-BATTERY INFORMATION STORAGE MEDIUM

BACKGROUND OF THE INVENTION

The present invention relates to a reader/writer and, more particularly, to a reader/writer which serves as, e.g., an information processing system to perform radio communication with a no-battery information storage medium such as a battery-less radio card or radio tag.

Recently, in the field of information processing apparatuses, information processing systems including an information processing apparatus such as a reader/writer for performing, in a noncontact state, radio communication with a no-battery information storage medium such as a battery-less radio card or radio tag applied as, e.g., an access control system has been developed.

In this case, while receiving the power by a radio wave transmitted from a transmission antenna on the information processing apparatus side such as the reader/writer, the no-battery information storage medium side such as the battery-less radio card or radio tag transmits data as an amplitude-modulated signal with a low degree of modulation to the reader/writer side.

The reader/writer side receives a radio wave transmitted from the battery-less radio card or radio tag side through a reception antenna.

The reader/writer side amplifies the received signal to a sufficient magnitude, and then performs detection processing and information processing for demodulating the received signal.

In this radio information processing system, however, communication between the reader/writer and the no-battery information storage medium such as the battery-less radio card or radio tag at a relatively short destance is influenced by the interference between the transmission and reception systems. The interference is due to the proximity of the transmission and reception antennas on the reader/writer side and results in inefficient transmission/reception.

In conventional signal processing where the amplitude-modulated signal with a low degree of modulation received on the reader/writer side is directly amplified to perform detection for modulation causes, saturation at a low power supply voltages, poses a problem in signal processing.

BRIEF SUMMARY OF THE INVENTION

The present invention, therefore, has been made in consideration of the above problems in the prior art. It objective, therefore, is to provide a reader/writer, in an information processing system for transmitting power and modulated data to a no-battery information storage medium having a communication function in a noncontact state, and receiving modulated data from the no-battery information storage medium, which eliminates the influence of interfere between transmission and reception systems allow efficient transmission/reception, and avoids saturation to perform satisfactory signal processing even when the power supply voltage is low.

One to an aspect of the present invention, provides a reader/writer which transmits power and modulated data to a no-battery information storage medium having a communication function in a noncontact state, and receives modulated data from the no-battery information storage medium, comprising:

a driver for transmitting the power and the modulated data;

a loop antenna connected to an output line of the driver to receive a transmission carrier current from the driver; and current detection means, arranged between the loop antenna and the output line of the driver, for extracting, as a received signal, a change in transmission carrier current of the loop antenna caused by a signal of the modulated data received by the loop antenna while the transmission carrier current is supplied from the driver upon reception of the modulated data from the no-battery information storage medium.

Another aspect of the present invention provides a reader/writer which transmits power and modulated data to a no-battery information storage medium having a communication function in a noncontact state, and receives modulated data from the no-battery information storage medium, comprising:

first and second drivers for transmitting the power and the modulated data;

first and second loop antennas connected to respective output lines of the first and second drivers to respectively receive transmission carrier currents from the first and second drivers;

first and second current detection means, arranged between the first and second loop antennas and the respective output lines of the first and second drivers, for extracting, as received signals, changes in transmission carrier currents of the first and second loop antennas caused by signals of the modulated data received by the first and second loop antennas while the transmission carrier currents are supplied from the first and second drivers upon reception of the modulated data from the no-battery information storage medium; and addition means for adding the modulated data signal currents extracted from respective outputs from the first and second current detection means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

Reference will now be made in detail to the presently preferred embodiments of the invention as illustrated in the accompanying drawings, in which like reference characters designate like or corresponding parts throughout the several drawings.

The general description of the present invention will be described prior to the description of embodiments of the present invention.

Figure 1:
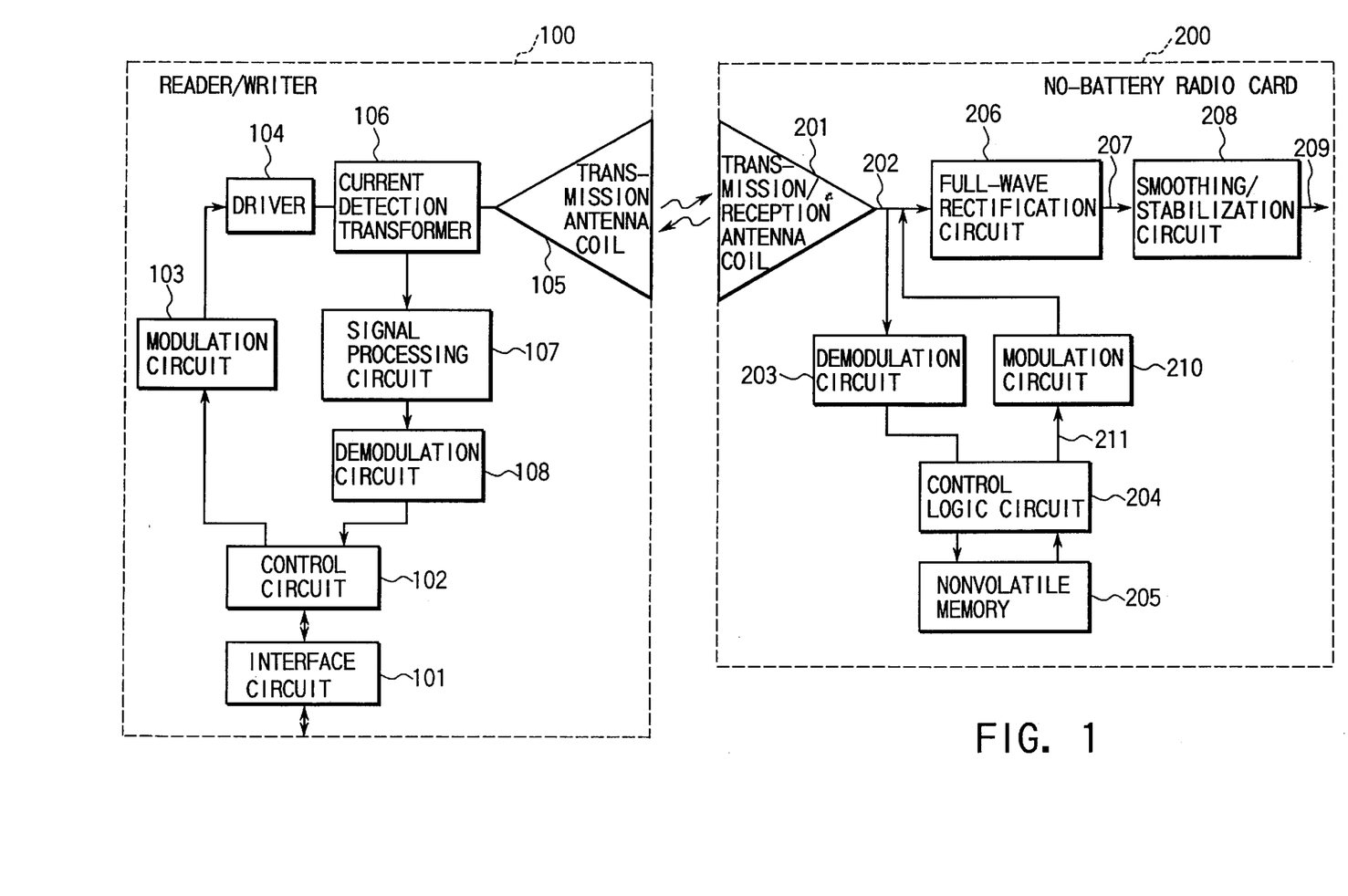
FIG. 1 is a block diagram for explaining the general description of the present invention.

FIG. 1 shows the schematic arrangement of an information processing system formed by a reader/writer 100 and a no battery information storage medium 200. The reader/writer 100 serves as an information processing apparatus for performing mutual radio communication. The no battery information storage medium 200 can be a no-battery radio card. The present invention particularly relates to improving the reader/writer 100 portion.

The schematic arrangement of the reader/writer 100 will be first described with reference to FIG. 1. The reader/writer 100 transmits power and data from a loop transmission antenna coil 105 to the no-battery radio card 200 via a modulation circuit 103 and a driver 104.

The no-battery radio card 200 receives the power and the data via a transmission/reception antenna coil 201, and supplies an output 207 from a full-wave rectification circuit 206 as a DC-power supply output 209 stabilized by a smoothing/stabilization circuit 208 to the respective portions of a circuit inside the card 200.

The present invention is provides a new reader/writer 100. That is, on the reader/writer 100 side of the information processing system, a current detection transformer 106 receives transmission data from the no-battery radio card 200 side without requiring a reception antenna. Rather, a signal processing circuit 107 and a demodulation circuit 108 perform predetermined processing.

In FIG. 1, the reader/writer 100 comprises, in addition to the above arrangement, an interface circuit 101 for communicating with an external host device (not shown), and a control circuit 102 for transmission/ reception control. The control circuit 102 is connected to the interface circuit 101 as well as the modulation and demodulation circuits 103 and 108.

The no-battery radio card 200 comprises, in addition to the above arrangement, demodulation and modulation circuits 203 and 210 that are connected to the transmission/reception coil 201, a control logic circuit 204 that are connected to the demodulation and modulation circuits 203 and 210, and a nonvolatile memory 205 that is connected to the control logic circuit 204. These circuits 203, 210, 204, and 205 receive the DC-power supply output 209 from the smoothing/stabilization circuit 208, as described above.

An embodiment of the present invention based on the above general description will be described below with reference to the several views of the drawing.

Figures 2, 3:
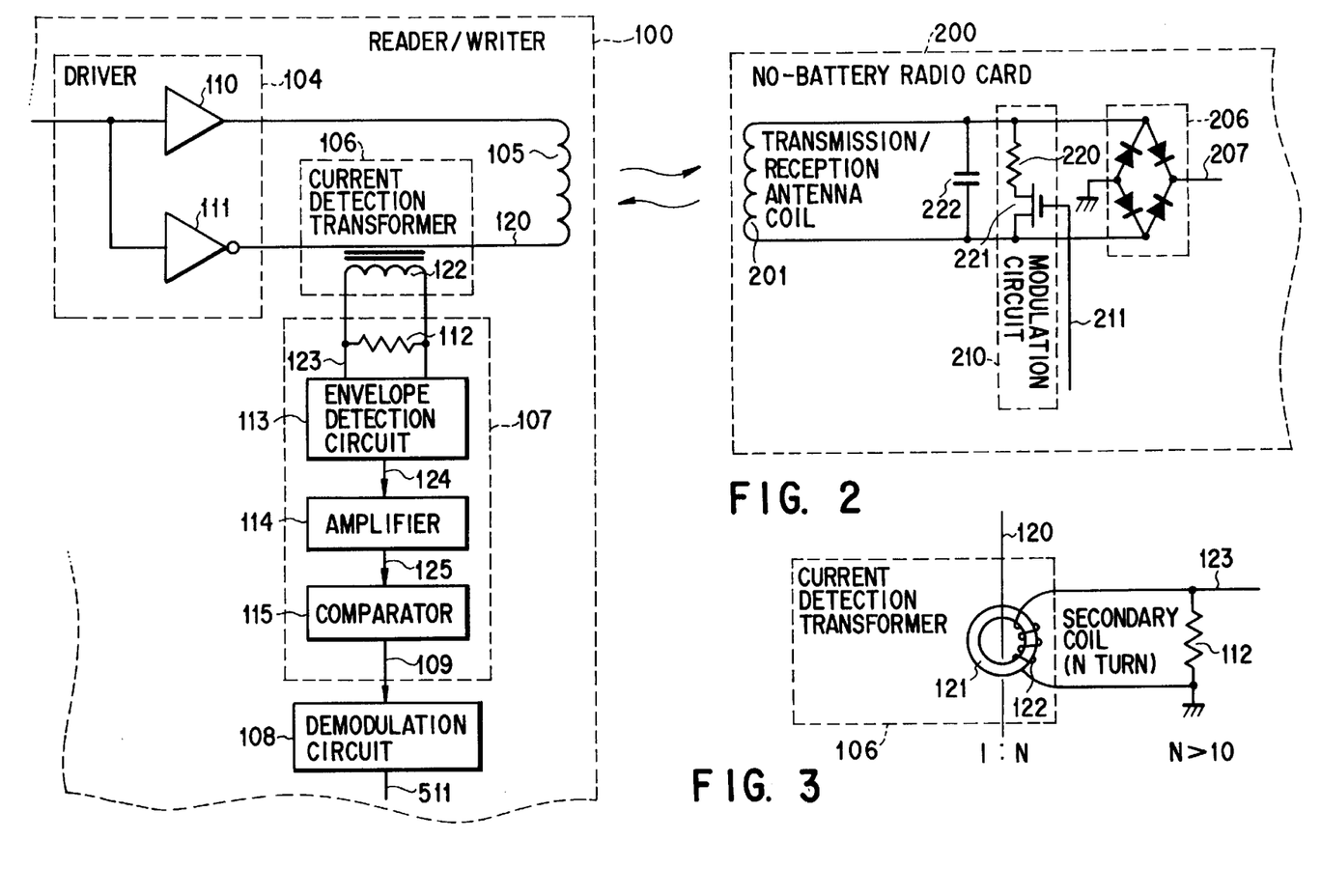
FIG. 2 is a block diagram showing the arrangement of main part according to the first embodiment of the present invention.
FIG. 3 is a view showing a detailed example of a current detection transformer used in the first embodiment.

FIG. 2 shows the arrangement, extracted from FIG. 1, of the main part of an information processing apparatus according to the first embodiment of the present invention.

As shown in FIG. 2, the driver 104 of the reader/writer 100 includes a positive-phase constant-voltage driver 110 and a negative-phase constant-voltage driver 111. The driver 104 performs a push-pull operation to supply a transmission current including power and transmission data to the transmission antenna coil 105 by effectively using a low power supply voltage.

After the power and the transmission data transmitted from the transmission antenna coil 105 of the reader/writer 100 are received by the transmission/reception antenna coil 201 of the no-battery radio card 200, they are rectified by the full-wave rectification circuit 206 constituted by a diode bridge circuit, and used to generate the above-described DC-power supply output.

On the no-battery radio card 200 side, transmission data 211 from the modulation circuit 210 (see FIG. 1) is inputted to the gate of a transistor 221 while the transmission of the power from the reader/writer 100 is received. The transistor 221 is turned on/off in accordance with the transmission data 211 to apply load variations to the transmission/reception antenna coil 201, thereby transmitting data from the no-battery radio card 200 to the reader/writer 100 side.

The transmission antenna coil 105 of the reader/writer 100 includes a loop coil to generate an electromotive force in response to the transmission data from the transmission/reception antenna coil 201 of the no-battery radio card 200.

As a result, a reception data signal current from the no-battery radio card 200 side which is superposed on the transmission current from the reader/writer 100 side flows through a line which is connected to the transmission antenna coil 105 via a line extending from the output of the constant-voltage driver 110, and extended from the transmission antenna coil 105 to the output of the constant-voltage driver 111.

Since the current detection transformer 106 is interposed in the line 120 between the output of the constant-voltage driver 111 and the transmission antenna coil 105, the reception data signal from the no-battery radio card 200 side which is superposed on the transmission current from the reader/writer 100 side can be obtained as a reception signal 123 across the two terminals of a load resistor 112 of a secondary coil 122 of the current detection transformer 106.

FIG. 3 shows a detailed arrangement of the current detection transformer 106.

More specifically, in FIG. 3, a line 120 is wound on a toroidal core 121, and the secondary coil 122 having a predetermined number of turns, i.e., N turns is arranged on the toroidal core 121. Assuming that $i_0$ is an AC current flowing through the line 120, a current $i_0 \times (1/N)$ flows through the secondary coil 122. This current can be extracted as the reception signal 123.

If the number N of turns of the secondary coil 122 is set large (e.g., N>10), the influence on the transmission current of the transmission antenna coil 105 can be satisfactorily decreased.

For example, if the number N of turns is set to 20, only 1/20, i.e., 5% the transmission current is extracted from the secondary coil 122 of the current detection coil 106, and can be ignored as the load on the transmission current.

Figure 4A:
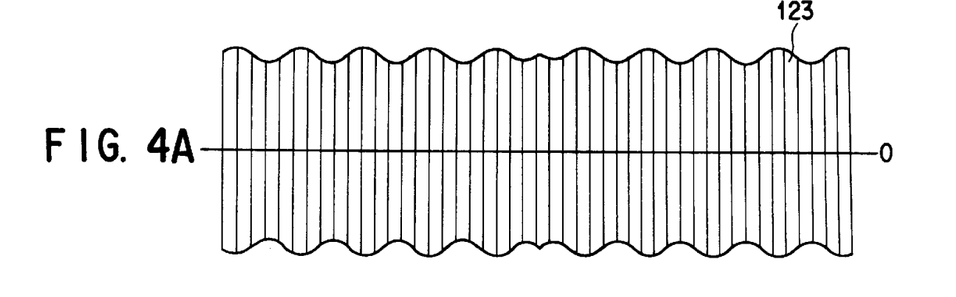
FIGS. 4A to 4E are waveform charts, respectively, for explaining the operation of the first embodiment.

In this manner, while transmitting the power to the no-battery radio card 200, the reader/writer 100 can extract the reception signal 123 from the no-battery radio card 200 which is superposed on the transmission current, as an amplitude-modulated signal with a low degree of modulation, as shown in FIG. 4A.

Figure 4B:
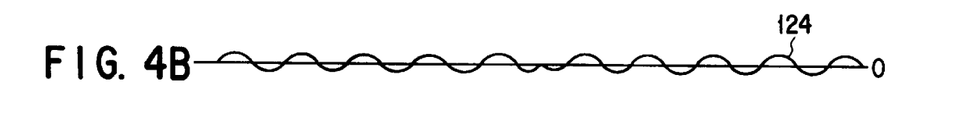

When the reception signal 123 from the current detection transformer 106 is detected by an envelope detection circuit 113, a detection output 124 like the one shown in FIG. 4B is obtained.

Figure 4C:
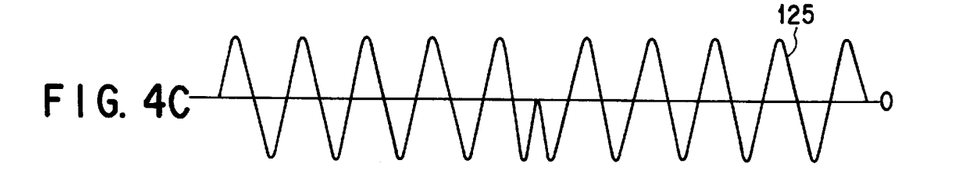

The detection output 124 is amplified by an amplifier 114 to obtain an output 125 like the one shown in FIG. 4C.

Figure 4D:
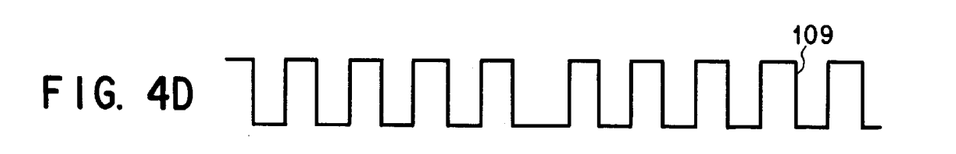

The output 125 is binarized by a comparator 115 to obtain a binarized output 109 like the one shown in FIG. 4D.

Figure 4E:
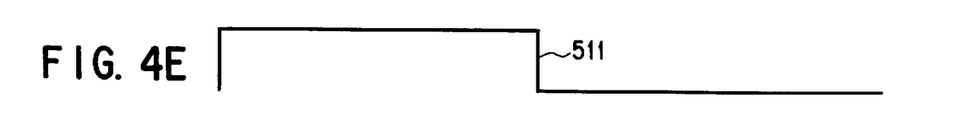

The binarized output 109 is demodulated by the demodulation circuit 108 to obtain a demodulated output 511 like the one shown in FIG. 4E.

An information processing apparatus according to the second embodiment of the present invention will be described below.

Figure 5:
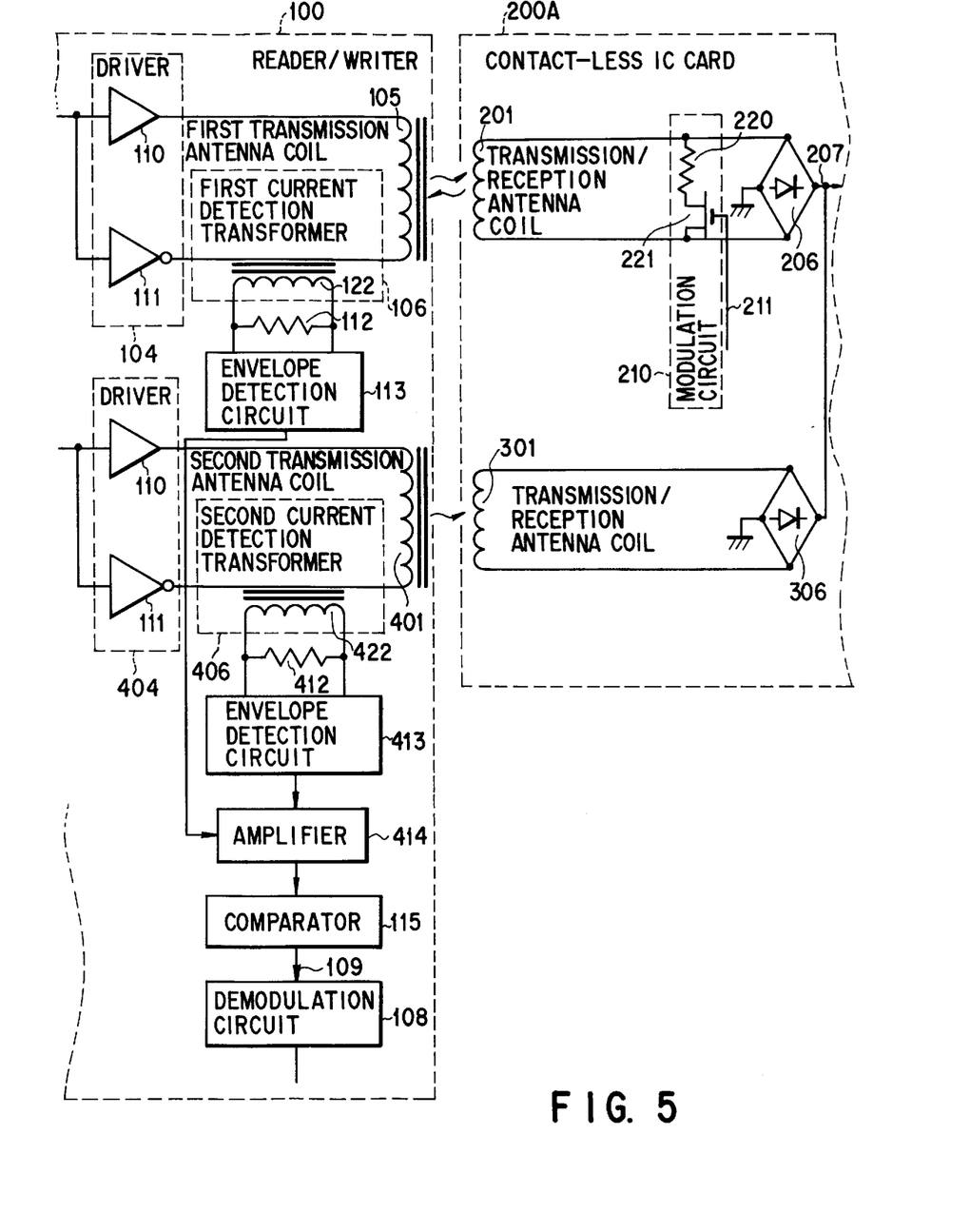
FIG. 5 is a block diagram showing the arrangement of main part according to the second embodiment of the present invention.

FIG. 5 shows the arrangement, extracted from FIG. 1, of the main part of the information processing apparatus according to the second embodiment of the present invention.

As one of contact-less IC card schemes which are going to be internationally standardized recently, there is a scheme in which power and data are transmitted/received between two transmission coils 105 and 401 of a reader/writer 100, and two transmission/reception coils 201 and 301 of a contact-less IC card 200A side, as shown in FIG. 5.

In this case, on the contact-less IC card 200A side, a data transmission modulation circuit 210 is includes a resistor 220, a MOS transistor 221, and the like. Data is transmitted by applying load variations to one of the transmission/reception antenna coils 201 and 301.

Another modulation circuit 210 having this arrangement must be arranged in the antenna coil 301. However, the contact-less IC card 200A is desirably constituted by an LSI as small as possible in order to bury it in a card having a thickness of 0.76 mm as an ISO credit card size. Therefore, as for the modulation circuit 210, one circuit is more preferable than two circuits.

In this embodiment, the number of circuits of the contact-less IC card 200A is decreased, and a simple circuit is added to the reader/writer 100 side to allow satisfactory reception.

More specifically, as shown in FIG. 5, a first current detection transformer 106 is arranged on a line connecting the output of a constant-voltage driver 104 of the reader/writer 100 with the first transmission antenna coil 105. A second current detection transformer 406 is arranged on a line connecting the output of a constant-voltage driver 404 with the second transmission antenna coil 401. Outputs from first and second envelope detection circuits 113 and 413 are inputted into a summing-amplifier 414. Upon detection of these reception signals, they are summed and amplified by the summing-amplifier 414.

An output from the summing-amplifier 414 is binarized into a binary output 109 by a comparator 115, and then demodulated by a demodulation circuit 108.

As for a reception signal 123 shown in FIG. 4A, a signal having undergone binary phase modulation with a sub-carrier having a synchronous frequency 1/n (n is an integer) the transmission carrier frequency used for transmission serves as a modulated signal transmitted from the no-battery radio card or the contact-less IC card.

In this manner, according to this embodiment, the current detection transformers 106 and 406 are arranged respectively on lines connecting the drivers 104 and 404 of the reader/writer 100 with the transmission antenna coils 105 and 401. Accordingly, data can be transmitted stably by arranging the modulation circuit 210 in only one of the two transmission/reception antenna coils 201 and 301 inside the contact-less IC card 200A.

FIG. 6 and FIGS. 7A to 7F respectively show the arrangement of a new demodulation circuit 108 for the above-described binary-phase-modulated binary signal 109, and the timing charts of its operation as the main part of the third embodiment of the present invention.

Figure 6:
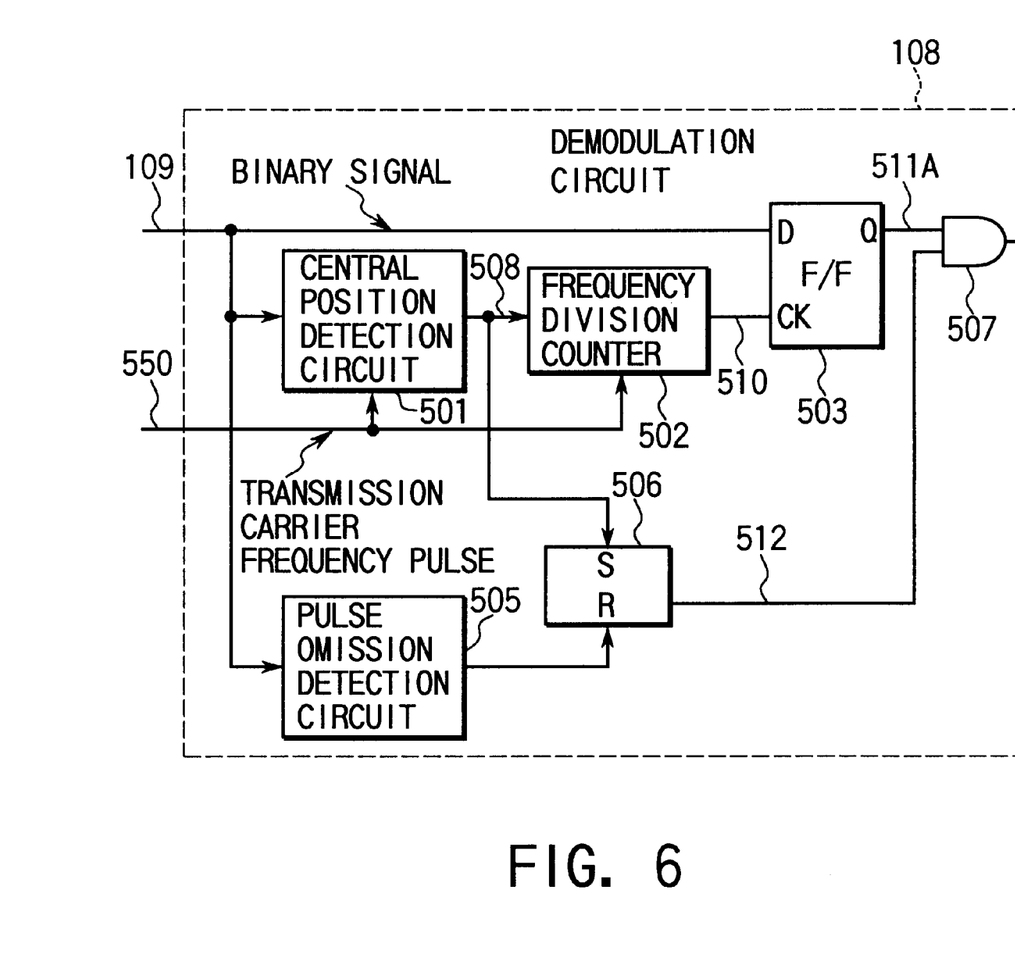
FIG. 6 is a block diagram showing the arrangement of main part according to the third embodiment of the present invention.

More specifically, in FIG. 6, a transmission carrier frequency pulse 550 is inputted into a central position detection circuit 501 and a frequency division counter 502. The central position detection circuit 501 detects the central position of the pulse of a binary-phase-modulated binary 109 and the frequency division counter 502 generates a demodulation clock.

In this embodiment, a signal having undergone binary phase modulation with a sub-carrier having a $1/16$ frequency in synchronism with the transmission carrier frequency used for transmission is transmitted from a no-battery radio card 200 or a contact-less IC card 200A. This signal serves as a reception signal 123 of a reader/writer 100 (see FIGS. 2 and 5), is subjected to detection, amplification, and binarization, and inputted to the demodulation circuit 108.

Figure 7A:
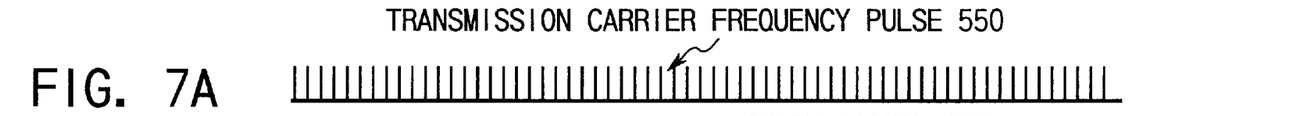
FIGS. 7A to 7F are timing charts, respectively, for explaining the operation of the third embodiment.
Figure 7B:
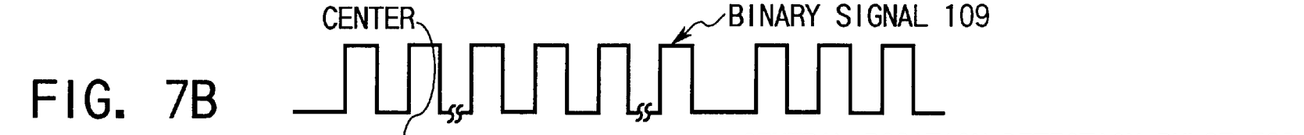
Figures 7C, 7D:
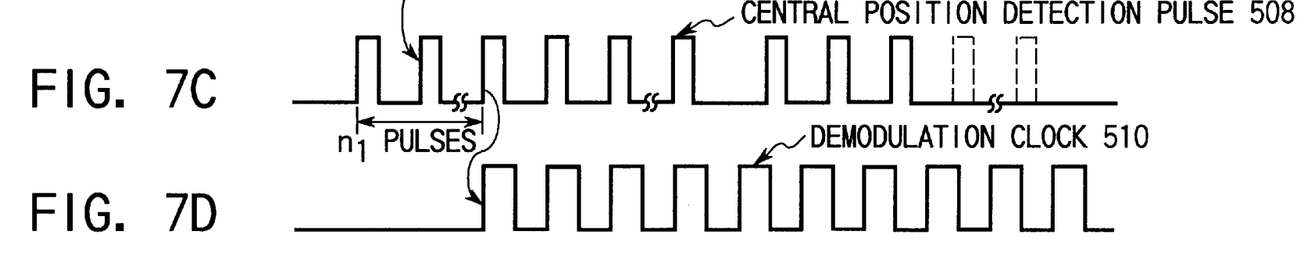
Figure 7E:
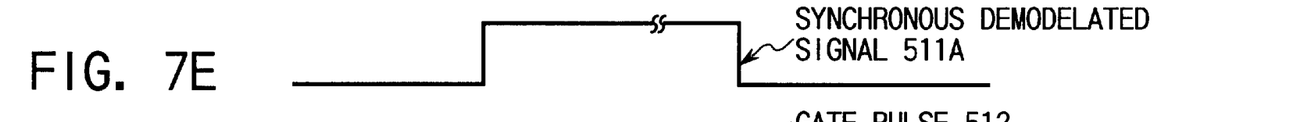
Figure 7F:
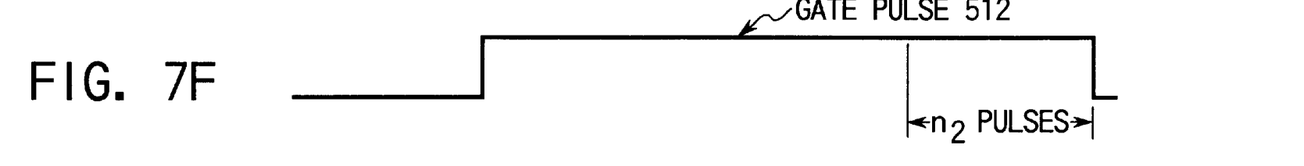

The central position detection circuit 501 starts counting on the basis of the transmission carrier frequency pulse 550 (FIG. 7A) every ON period of the pulse of the binary-phase-modulated binary signal 109 (FIG. 7B). If the pulse of the binary signal 109 still exists after 4 pulses have been counted, a central position detection pulse 508 appearing after this timing (FIG. 7C) is outputted.

At the timing when the central position detection pulses 508 corresponding to $n_1$ pulses are continuously counted, the 16-frequency division counter 502 begins to generate a demodulation clock 510 (FIG. 7D) obtained by frequency-dividing the transmission carrier frequency pulse 550 into 16 pulses.

Since the rise time of the demodulation clock 510 is adjusted to substantially the central position of the binary-phase-modulated binary signal 109, a synchronous demodulated signal 511A (FIG. 7E) of the binary-phase-modulated signal 109 stabilized by a D flip-flop 503 can be attained.

When the central position of the pulse of the binary-phase-modulated signal 109 is detected, and the $n_1$ pulses are continuously detected, a flip-flop 506 is set. At the same time, the binary-phase-modulated signal 109 is inputted into a pulse omission detection circuit 505. Upon detection of a state wherein $n_2$ or more pulses do not continuously exist, the flip-flop 506 is reset. With this operation, a gate pulse 512 (FIG. 7F) corresponding to the ON period of the binary-phase-modulated signal 109 can be generated.

The gate pulse 512 and the synchronous demodulated signal 511A of the binary-phase-modulated signal 109 can be inputted through an AND circuit 507 to enable a demodulated output within the period of the gate pulse 512.

As described in detail above, when the reader/writer communicates with the battery-less radio card at a relatively short distance, the influence of the interfere between the transmission and reception antenna coils caused by their close proximity is conventionally great on the reader/writer side and causes inefficient transmission/reception. In the present invention, since the current detection transformer is located on the line connecting the transmission driver with the transmission antenna coil, a reception signal can be obtained from an output of the current detection transformer without requiring any reception antenna on the reader/writer side. With this configuration, an efficient transmission/reception can be performed without causing any interfere between the antennas, unlike the prior art.

In the present invention, since the turn ratio is set to sufficiently decrease a current on the secondary side of the current detection transformer, the current detection transformer does not act as a load on the drive current of the transmission antenna coil.

In the present invention, a low-modulation-degree signal of a reception signal obtained from the current detection transformer is subjected to envelope detection before amplification. Even if the signal is greatly amplified, it can be amplified without any distortion to allow stable signal processing.

In the present invention, the central position of a signal having undergone binary phase modulation with a 1/n sub-carrier frequency in synchronism with the transmission carrier frequency is detected using the transmission carrier frequency, and a demodulation clock is generated at this timing. As a result, stable demodulation can be performed.

In the present invention, since the present period of the reception signal is detected to enable a demodulated output for only this period, only a correct demodulated output can be output.

As has been described in detail above, according to the present invention, an information processing apparatus which transmits power and modulated data to a no-battery information storage medium having a communication function in a noncontact state, and receives modulated data from the no-battery information storage medium, wherein the influence of the interfere between the transmission and reception systems is removed to allow efficient transmission/reception, and saturation is avoided to perform satisfactory signal processing even when the power supply voltage is low can be provided.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

We claim:

1. A reader/writer which transmits power and modulated data to a no-battery information storage medium having a communication function in a noncontact state, and receives modulated data from said no-battery information storage medium, comprising:

a driver for transmitting the power a nd the modulated data;

a loop antenna connected to an output line of said driver to receive a transmission carrier current from said driver; and current detection means, arranged between said loop antenna and the output line of said driver, for extracting, as a reception signal, a change in transmission carrier current of said loop antenna caused by a signal of the modulated data received by said loop antenna while the transmission carrier current is supplied from said driver upon reception of the modulated data from said no-battery information storage medium wherein, when a binary-phase-modulated signal having undergone binary phase modulation with a sub-carrier having a frequency 1/n (n is an integer) a transmission carrier frequency used for transmission is received as the modulated data from said no-battery information storage medium, said reader/writer uses said current detection means to extract, as the modulated data received by said loop antenna, a signal current of the binary-phase-modulated signal having undergone binary phase modulation with the sub-carrier having the frequency 1/n the transmission carrier frequency used for transmission, and further comprises signal processing means for changing the binary-phase-modulated signal extracted by said current detection means into a binary signal; and demodulation means for starting counting from an edge of a pulse for an ON period of the pulse of the binary signal from said signal processing means on the basis of the transmission carrier frequency to detect a timing of substantially a center of a width of the pulse, and starting dividing the transmission carrier frequency from a detection timing to generate a clock having the same frequency as that of the sub-carrier, and to use the clock as a demodulation clock for the binary-phase-modulated signal.

2. A reader/writer according to claim 1, wherein, when an amplitude-modulated signal with a low degree of modulation is received as the modulated data from said no-battery information storage medium, said reader/writer uses said current detection means to extract, as the reception signal, the change in transmission carrier current of said loop antenna caused by the modulated data signal received by said loop antenna, and further comprises an amplifier for amplifying the signal extracted by said current detection means.

3. A reader/writer according to claim 1, wherein said driver performs constant-voltage driving.

4. A reader/writer according to claim 1, wherein said current detection means includes a current detection transformer, and said loop antenna includes a loop antenna coil.

5. A reader/writer according to claim 4, wherein a current extracted from an output from said current detection transformer is not more than 1/10 a current flowing through said loop antenna coil.

6. A reader/writer according to claim 2, wherein said current detection means is arranged between said loop antenna and the output line of said driver, and constituted by a transformer for detecting the transmission carrier current flowing through said loop antenna, and an envelope detection circuit for detecting an envelope of an output from said transformer to extract the signal received by said loop antenna.

7. A reader/writer which transmits power and modulated data to a no-battery information storage medium having a communication function in a noncontact state, and receives modulated data from said no-battery information storage medium, comprising:

first and second drivers for transmitting the power and the modulated data;

first and second loop antennas connected to respective output lines of said first and second drivers to respectively receive transmission carrier currents from said first and second drivers;

first and second current detection means, arranged between said first and second loop antennas and the respective output lines of said first and second drivers, for extracting, as reception signals, changes in transmission carrier currents of said first and second loop antennas caused by signals of the modulated data received by said first and second loop antennas while the transmission carrier currents are supplied from said first and second drivers upon reception of the modulated data from said no-battery information storage medium; and addition means for adding the modulated data signal currents extracted from respective outputs from said first and second current detection means.

8. A reader/writer according to claim 7, wherein, when an amplitude-modulated signal with a low degree of modulation is received as the modulated data from said no-battery information storage medium, said reader/writer uses said first and second current detection means to extract, as the reception signals, the changes in transmission carrier currents of said first and second loop antennas caused by the modulated data signals received by said first and second loop antennas, and further comprises an amplifier for amplifying the signals extracted by said first and second current detection means.

9. A reader/writer according to claim 7, wherein, when a binary-phase-modulated signal having undergone binary phase modulation with a sub-carrier having a frequency 1/n (n is an integer) a transmission carrier frequency used for transmission is received as the modulated data from said no-battery information storage medium, said reader/writer uses said first and second current detection means to extract, as the modulated data received by said first and second loop antennas, a signal current of the binary-phase-modulated signal having undergone binary phase modulation with the sub-carrier having the frequency 1/n the transmission carrier frequency used for transmission, and further comprises signal processing means for changing the binary-phase-modulated signal extracted by said first and second current detection means into a binary signal; and demodulation means for starting counting from an edge of a pulse for an ON period of the pulse of the binary signal from said signal processing means on the basis of the transmission carrier frequency to detect a timing of substantially a center of a width of the pulse, and starting dividing the transmission carrier frequency from a detection timing to generate a clock having the same frequency as that of the sub-carrier, and to use the clock as a demodulation clock for the binary-phase-modulated signal.

10. A reader/writer according to claim 7, wherein, when a binary-phase-modulated signal having undergone binary phase modulation with a sub-carrier having a frequency 1/n (n is an integer) a transmission carrier frequency used for transmission is received as the modulated data from said no-battery information storage medium, said reader/writer uses said first and second current detection means to extract, as the modulated data received by said first and second loop antennas, a signal current of the binary-phase-modulated signal having undergone binary phase modulation with the sub-carrier having the frequency 1/n the transmission carrier frequency used for transmission, and further comprises signal processing means for changing the binary-phase-modulated signal extracted by said first and second current detection means into a binary signal; and demodulation means for starting counting from an edge of a pulse for an ON period of the pulse of the binary signal from said signal processing means on the basis of the transmission carrier frequency to detect a timing of substantially a center of a width of the pulse, and when the timing is continuously detected a predetermined number of times, turning on a gate for the demodulated output of the binary-phase-modulated signal to enable the demodulated output, or when the timing cannot be detected the predetermined number of times within a predetermined time, turning off said gate to disable the demodulated output.

11. A reader/writer according to claim 7, wherein said first and second drivers perform constant-voltage driving.

12. A reader/writer according to claim 7, wherein said first and second current detection means respectively include current detection transformers, and said first and second loop antennas respectively include loop antenna coils.

13. A reader/writer according to claim 12, wherein a current extracted from an output from each of said current detection transformers is not more than $\frac{1}{10}$ a current flowing through each of said loop antenna coils.

14. A reader/writer according to claim 8, wherein said first and second current detection means are respectively arranged between said first and second loop antennas and the output lines of said first and second drivers, and constituted by first and second transformers for detecting the transmission carrier currents flowing through said first and second loop antennas, and first and second envelope detection circuits for detecting envelopes of outputs from said first and second transformers to extract the signals received by said first and second loop antennas.

15. A reader/writer according to claim 7, wherein the modulated data signal currents extracted from respective outputs from said first and second current detection means are respectively subjected to amplitude modulation detection, and then added.

16. A reader/writer which transmits power and modulated data to a no-battery information storage medium having a communication function in a noncontact state, and receives modulated data from said no-battery information storage medium, comprising:

a driver for transmitting the power and the modulated data;

a loop antenna connected to an output line of said driver to receive a transmission carrier current from said driver; and current detection means, arranged between said loop antenna and the output line of said driver, for extracting, as a reception signal, a change in transmission carrier current of said loop antenna caused by a signal of the modulated data received by said loop antenna while the transmission carrier current is supplied from said driver upon reception of the modulated data from said no-battery information storage medium wherein, when a binary-phase-modulated signal having undergone binary phase modulation with a sub-carrier having a fraquency 1/n (n is an integer) a transmission carrier frequency used for transmission is received as the modulated data from said no-battery information storage medium, said reader/writer uses said current detection means to extract, as the modulated data received by said loop antenna, a signal current of the binary-phase-modulated signal having undergone binary phase modulation with the sub-carrier having the frequency 1/n the transmission carrier frequency used for transmission, and further comprises signal processing means for changing the binary-phase-modulated signal extracted by said current detection means into a binary signal; and demodulation means for starting counting from an edge of a pulse for an ON period of the pulse of the binary signal from said signal processing means on the basis of the transmission carrier frequency to detect a timing of substantially a center of a width of the pulse, and when the timing is continuously detected a predetermined number of times, turning on a gate for the demodulated output of the binary-phase-modulated signal to enable the demodulated output, or when the timing cannot be detected the predetermined number of times within a predetermined time, turning off said gate to disable the demodulated output.

17. A reader/writer according to claim 16, wherein, when an amplitude-modulated signal with a low degree of modulation is received as the modulated data from said no-battery information storage medium, said reader/writer uses said current detection means to extract, as the reception signal, the change in transmission carrier current of said loop antenna caused by the modulated data signal received by said loop antenna, and further comprises an amplifier for amplifying the signal extracted by said current detection means.

18. A reader/writer according to claim 16, wherein said driver performs constant-voltage driving.

19. A reader/writer according to claim 18, wherein said current detection means includes a current detection transformer, and said loop antenna includes a loop antenna coil.

20. A reader/writer according to claim 19, wherein a current extracted from an output from said current detection transformer is not more than $1/10$ a current flowing through said loop antenna coil.

21. A reader/writer according to claim 17, wherein said current detection means is arranged between said loop antenna and the output line of said driver, and includes a transformer for detecting the transmission carrier current flowing through said loop antenna, and an envelope detection circuit for detecting an envelope of an output from said transformer to extract the signal received by said loop antenna.

* * * * *